US009888014B2

(12) United States Patent
Rodniansky

(10) Patent No.: US 9,888,014 B2
(45) Date of Patent: Feb. 6, 2018

(54) ENFORCING SECURITY FOR SENSITIVE DATA ON DATABASE CLIENT HOSTS

(71) Applicant: INTERNATIONAL BUSINESS MACHINES CORPORATION, Armonk, NY (US)

(72) Inventor: Leonid Rodniansky, Allston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 14/869,971

(22) Filed: Sep. 29, 2015

(65) Prior Publication Data

US 2017/0093878 A1 Mar. 30, 2017

(51) Int. Cl.
G06F 21/62 (2013.01)
H04L 29/06 (2006.01)
G06F 17/30 (2006.01)

(52) U.S. Cl.
CPC ........ H04L 63/105 (2013.01); G06F 21/6218 (2013.01); H04L 63/10 (2013.01); G06F 17/30424 (2013.01)

(58) Field of Classification Search
CPC ............. G06F 21/6227; G06F 21/6218; G06F 2221/2141; Y10S 707/99939; Y10S 707/99931; H04L 63/105; H04L 63/10
See application file for complete search history.

(56) References Cited

U.S. PATENT DOCUMENTS 7,085,839 B1 8/2006 Baugher et al.
7,904,454 B2 3/2011 Raab
8,914,328 B2 * 12/2014 Kushwah .......... G06F 17/30067
  707/654
2007/0110224 A1 * 5/2007 Gumpel .............. G06F 21/6245
  380/28
2014/0090079 A1 * 3/2014 Kawakita ............ G06F 21/6218
  726/27

(Continued)

FOREIGN PATENT DOCUMENTS

CN       103544286 A  *  1/2014
WO    WO 2016122604 A1  *  8/2016  ........... G06F 21/554

OTHER PUBLICATIONS

"Data Security and Privacy", IBM, accessed from the Internet as of Sep. 29, 2015 from <http://www-03.ibm.com/software/products/en/category/data-security>, 2 pages.

Primary Examiner — Farid Homayounmehr
Assistant Examiner — Zhimei Zhu
(74) Attorney, Agent, or Firm — Jeffrey S. LaBaw; Amy J. Pattillo

(57) ABSTRACT

A restriction agent resides on a database client host, the database client host receiving first data from a database secured by a database access control system, the first data comprising sensitive information authorized by the database access control system for access by an authorized user requesting access to the database through a database client resident on the database client host. The restriction agent receives one or more instructions from a database access control system relative to the first data. The restriction agent enforces the one or more instructions on the database client host to restrict access to the first data to the authorized user only from among multiple users of the database client host.

20 Claims, 8 Drawing Sheets

(56) References Cited

U.S. PATENT DOCUMENTS

2014/0258715 A1    9/2014  Rodniansky
2015/0082399 A1    3/2015  Wu et al.
2016/0196442 A1*   7/2016  Chapman, III ......... G06F 21/53
                                                          726/29

* cited by examiner

| DATABASE SESSION 500 |
|---|
| [1] OS COMMAND 510 |
| [database123@xxxxx ~]$ sqlplus scott/tiger ⟶ 512 |
| [a] STARTS OS PROCESS, BELONGING TO OS USER "DATABASE123" ON THE DATABASE CLIENT HOST |
| UID        PID    PPID  C  STIME  TTY    TIME     CMD<br>database123  18968  15144  0  14:02  pts/0  00:00:00  SQLPLUS   514 |
| [b] STARTS AUTHENTICATION CONNECTION TO THE DATABASE SERVER FOR DATABASE USER "SCOTT" ON THE DATABASE CLIENT |
| 000000c0 : 00 00 08 41 55 54 48 5f 50 49 44 05 00 00 00 05   ...AUTH_PID.........<br>000000d0 : 31 38 39 36 38 00 00 00 00 08 00 00 00 08 41 55   18968.............AU<br>000000e0 : 54 48 5f 53 49 44 06 00 00 00 06 6f 72 61 63 6c   TH_UID.......... data1<br>000000f0 : 65 00 00 00 00           PACKET 516   base123.... |
| [2] (a) THE SERVER AGENT INTERCEPTS DATABASE PROTOCOL AUTHENTICATION NEGOTIATION PACKETS ALONG WITH PACKET 516; (b) THE SERVER AGENT SENDS ALL THE PACKETS TO THE EDS FOR A VERDICT 518 |
| [3] (a) ESD PERMITS DATABASE CLIENT REQUESTS TO CONTINUE TO THE DATABASE SERVER BY SENDING VERDICTS "RELEASE DATABASE REQUEST" TO THE SERVER AGENT; (b) ESD KEEPS SESSION INFORMATION, ALONG WITH CLIENT PID 18968 520 |
| [4] FIRST SQLPLUS COMMAND 522 |
| SQL> spool/tmp/m.txt ⟶ 524 |
| CREATES THE OUTPUT FILE "/TMP/M.TXT" BELONGING TO OS USER "DATABASE 123" ON THE DATABASE CLIENT HOST 526 |
| [database123@xxxxx ~]$ /usr/sbin/lsof -p 18968<br><br>COMMAND  PID    USER         FD   TYPE  DEVICE  SIZE  NODE      NAME<br>-----------------------------------------<br>SQLPLUS  18968  DATABASE123  9W  REG   253,0    0     22249482  /TMP/M.TXT |
| [5] SECOND SQLPLUS COMMAND 530 |
| SQL> select * from SENSITIVE_INFORMATION ⟶ 532 |
| (a) THE DATABASE CLIENT SENDS A DATABASE PROTOCOL PACKET WITH THE SQL STATEMENT TO THE DATABASE SERVER 534 |
| 000000c0 : 00 00 00 00 00 00 00 00 00 00 00 00 00 21 73 65   .................!se<br>000000d0 : 6C 65 63 74 20 2a 20 66 72 6f 6d 20 50 52 49 56   lect * from PRIV   PACKET<br>000000e0 : 41 54 45 5f 49 4e 46 4f 52 4d 41 54 49 4f 4e 01   ATE_INFORMATION   536<br>000000f0 : 00 00 00 00 00 00 00 00 00 00 00 00 00 00 00 00   ................. |
| (b) THE SERVER AGENT INTERCEPTS PACKET 536 AND SENDS PACKET 536 TO THE ESD; (c) THE ESD PARSES PACKET 536 AND SQL STATEMENT TO DATABASE OPERATION AND DATABASE OBJECT LEVEL AND VERIFIES THE PARSED PACKET WITH SECURITY POLICIES 538 |

*FIG. 5A*

| [6] ESD DETERMINES AND SENDS INSTRUCTIONS TO THE RESTRICTION AGENT 540 |
|---|
| ESD DETERMINES THAT DATABASE USER "SCOTT" IS ALLOWED TO USE THE SQL STATEMENT IN PACKET 536 FOR DATABASE TABLE "SENSITIVE_INFORMATION", BUT DATA IN DATABASE TABLE "SENSITIVE_INFORMATION" NEED TO BE PROTECTED FROM UNAUTHORIZED ACCESS 542 |
| ESD SENDS INSTRUCTIONS TO THE CLIENT AGENT FOR THE PACKET 544<br>PID 18968 ~546<br>RULE : REGULAR EXPRESSION - [0-1]{9} ~548<br>ACTION: "MASK:*" ~550 |
| [7] RESTRICTION AGENT MONITORS PROCESSES WITH PID 18968 551 |
| [8] (a) ESD SENDS VERDICT "RELEASE DATABASE REQUEST" TO THE SERVER AGENT; (b) THE SERVER AGENT RELEASES THE QUERY FROM PACKET 536 TO THE DATABASE SERVER 552 |
| [9] THE DATABASE SERVER RETURNS RESULTS TO THE DATABASE CLIENT SQLPLUS 554 |
| 00000100 : 00 00 00 00 07 12 2C 01 02 05 41 6C 69 63 65 08 .........,....ALICE.<br>00000110 : 32 35 34 34 39 30 31 36 08 06 00 06 bc ec 6b 1d  25449016.......k.<br>..............................<br>00000040 : 02 03 42 6f 62 08 31 38 36 34 34 35 36 32 07 12  ..Bob.18644562...  RESULTS<br>00000050 : 2c 01 02 05 44 61 76 69 64 08 36 34 38 32 30 37  ...David.648207  PACKET<br>00000060 : 31 38 04 01 00 00 00 14 00 01 03 00 00 00 7b 05  18...............{.  556 |
| [10] DATABASE CLIENT SQLPLUS LOCALLY SAVES THE SECURED DATA INTO FILE "/TMP/M.TXT" 558 |
| SQL>select * from SENSITIVE_INFORMATION<br>-----------------------------------------------<br>NAME   SSN<br>-----------------------------------------------<br>Alice   025449016<br>Bob    018644562<br>David   064820718   FILE 560 |
| [11] RESTRICTION AGENT MONITORS FILE "/TMP/M.TXT", RUNS THE RULE ON THE FILE, AND APPLIES THE MASKING ACTION 562 |
| SQL>select * from SENSITIVE_INFORMATION<br>-----------------------------------------------<br>NAME   SSN<br>-----------------------------------------------<br>Alice   *********<br>Bob    *********<br>David   *********   FILE 564 |
| [12] THE RESTRICTION AGENT REPORTS THE ACTION TAKEN TO THE ESD 566 |

*FIG. 5B*

ENFORCING SECURITY FOR SENSITIVE DATA ON DATABASE CLIENT HOSTS

BACKGROUND

1. Technical Field

This invention relates in general to database security and more particularly to enforcing security for sensitive data received on database client hosts.

2. Description of the Related Art

In one example, a database may include sensitive data that is intended to be only accessible from the database by a user that is authorized to access the data.

BRIEF SUMMARY

A database access control system (DACS) provides data security external to a database to secure the database against unauthorized accesses to sensitive data by users from external database client hosts by limiting the network traffic that passes through to the database from external database client hosts to only requests from users who are authenticated and authorized to access sensitive data. Once the sensitive data is received at an external database client host in use by an authorized user, other database client applications on the database client host, other than the authorized user, may attempt to access the sensitive data. In view of the foregoing, there is a need for a method, system, and program product for enforcing data security on an external database client host for sensitive data received from a secured database for an authorized user.

In one embodiment, a method is directed to providing, by a computer, a restriction agent resident on a database client host, the database client host receiving first data from a database secured by a database access control system, the first data comprising sensitive information authorized by the database access control system for access by an authorized user requesting access to the database through a database client resident on the database client host, the database client sending one or more database protocol packets for requesting access to the database, the one or more database protocol packets specifying a particular process identifier for one or more particular processes from among a plurality of processes running on the database client host, wherein the database access control system intercepts the one or more database protocol packets between the database client resident on the database client host and the database and determines whether to allow the one or more database protocol packets that are intercepted to pass through from the database client to the database based on whether the one or more database protocol packets meet a security policy applied by the database access control system to the one or more database protocol packets. The method is directed to receiving, by the restriction agent, one or more instructions from the database access control system relative to the first data, the one or more instructions created by the database access control system based on analysis of the one or more database protocol packets sent by the database client relative to the first data, the one or more instructions specifying the particular process identifier. The method is directed to enforcing, by the restriction agent, the one or more instructions on the database client host to restrict access to the first data to the authorized user only from among a plurality of users of the database client host and to the one or more particular processes only identified in the particular process identifier from among the plurality of processes.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to provide a restriction agent resident on a database client host, the database client host receiving first data from a database secured by a database access control system, the first data comprising sensitive information authorized by the database access control system for access by an authorized user requesting access to the database through a database client resident on the database client host, the database client sending one or more database protocol packets for requesting access to the database, the one or more database protocol packets specifying a particular process identifier for one or more particular processes from among a plurality of processes running on the database client host, wherein the database access control system intercepts the one or more database protocol packets between the database client resident on the database client host and the database and determines whether to allow the one or more database protocol packets that are intercepted to pass through from the database client to the database based on whether the one or more database protocol packets meet a security policy applied by the database access control system to the one or more database protocol packets. The stored program instructions comprise program instructions to receive, by the restriction agent, one or more instructions from the database access control system relative to the first data, the one or more instructions created by the database access control system based on analysis of the one or more database protocol packets sent by the database client relative to the first data, the one or more instructions specifying the particular process identifier. The stored program instructions comprise program instructions to enforce, by the restriction agent, the one or more instructions on the database client host to restrict access to the first data to the authorized user only from among a plurality of users of the database client host and to the one or more particular processes only identified in the particular process identifier from among the plurality of processes.

In another embodiment, a computer program product comprises one or more computer-readable storage devices and program instructions, stored on at least one of the one or more storage devices. The stored program instructions comprise program instructions to provide a restriction agent resident on a database client host, the database client host receiving first data from a database secured by a database access control system, the first data comprising sensitive information authorized by the database access control system for access by an authorized user requesting access to the database through a database client resident on the database client host, the database client sending one or more database protocol packets for requesting access to the database, the one or more database protocol packets specifying a particular process identifier for one or more particular processes from among a plurality of processes running on the database client host, wherein the database access control system intercepts the one or more database protocol packets between the database client resident on the database client host and the database and determines whether to allow the one or more database protocol packets that are intercepted to pass through from the database client to the database based on whether the one or more database protocol packets meet a security policy applied by the database access control system to the one or more database protocol packets. The stored program instructions comprise program instructions to receive, by the restriction agent, one or more instructions from the database access control system relative to the first data, the one or more instructions created by the database access control system based on analysis of the one or more database protocol packets sent by the database client relative to the first data, the one or more instructions specifying the particular process identifier. The stored program instructions comprise program instructions to enforce, by the restriction agent, the one or more instructions on the database client host to restrict access to the first data to the authorized user only from among a plurality of users of the database client host and to the one or more particular processes only identified in the particular process identifier from among the plurality of processes.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIGS. 5A-5B are an illustrative example of multiple steps of a database session illustrated in FIG. 4 for a restriction agent residing on a database client host to protect sensitive data accessed by an authorized user from a database server secured by a DACS, at the client level, by restricting client process operations and data files from using the sensitive data;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
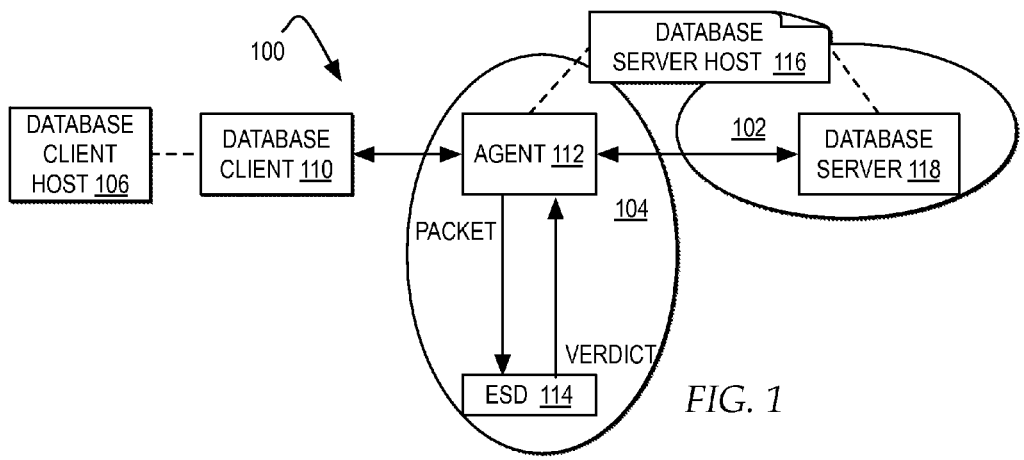
FIG. 1 is a block diagram illustrating one example of a network environment comprising a DACS that secures access by external database client hosts to sensitive data in a database by controlling network traffic to and from the database server.

FIG. 1 illustrates a block diagram of one example of a network environment comprising a DACS that secures access by external database client hosts to sensitive data in a database by controlling network traffic to and from the database server.

In one example, a network environment 100 includes one or more components for managing a DACS including, but not limited to, an agent 112 installed on a database server host 116 and an ESD 114. Database server host 116 hosts a database server 118, which manages accesses to one or more databases. Database server 118 may represent a server hosting one or more types of databases, including, but not limited to, an ORACLE database, a MICROSOFT (MS) SQL database, and one or more series of IBM DB2 databases.

One or more database clients, such as a database client 110, may send one or more types of requests, in database protocol packets, to database server 118. In one example, database client 110 may be hosted on a database client host 106. In one example, database server host 116 and database client host 106 may represent different host systems or a same host system.

In one example, database server 118 may include sensitive data that is only accessible to authorized users who are authenticated through database clients for access to database server 118. In particular, sensitive data may include information that an organization is responsible to protect from access by unauthorized users and information that the organization does not want accessed by unauthorized users. Database server 118 may require that a user authenticate the user's identity as an authorized user before providing access to the user to sensitive data. In one example, database server 118 is accessible within a secured network environment 102, such as a secured local area network. In one example, authorized users may authenticate through database clients that connect locally within secured network environment 102, as internal users, and database server 118 may apply security policies for controlling accesses to sensitive data according to security policies for the data being requested and the security level assigned to the user requesting the sensitive data. In addition, secured network environment 102 may support accesses to sensitive data in database server 118 by authorized users through database clients connected externally to secured network environment 102. In one example, secured network environment 102 may interface with a security network layer 104, such as a gateway or firewall, that includes agent 112 and ESD 114, for implementing a DACS, communicatively connected via one or more types of network connections. In another example, agent 112 and ESD 114 may be implemented in separate network environments with one or more security layers and protocols implemented for securing the network connection between agent 112 and ESD 114.

In one example, agent 112 intercepts all requests sent between database client 110 and database server 118 whether on a non-secured access level, such as an interprocess communication (IPC) level, or on a secured access level, such as a cryptographic method invocation level. In one example, agent 112 is not aware of the database protocols implemented by database server 118. In one example, agent 112 forwards all requests intercepted between database client 110 and database server 118 via a network connection security network layer 104 to an external security device (ESD) 114. In addition, agent 112 holds all forwarded requests and waits for a decision, or verdict, from ESD 114. In one example, ESD 114 is specified to determine whether a request is from an authorized user, to extract information about one or more data objects specified in a forwarded database request, and to validate data session security policies for the forwarded database request.

In one example, ESD 114 may include one or more components for handling communications that include database protocol packets. For example, ESD 114 may include a session management component for managing opening a new session for an authenticated user and monitoring for the close of the session, a packet analyzer for analyzing database protocol packets that arrive during the session to identify database request text, an text parser for identifying database commands within the database request text, and a database validator for determining whether the database command is authorized for the user requesting the command according to security policies. While a user may be an authenticated user with permission to access database server 118, the user may send database protocol packets during a session with requests to access database objects that the user is not authorized to access. ESD 114 determines whether authenticated users are authorized to send the requested database protocol packets to database server 118.

In one example, the security policies applied by ESD 114 may be specified for each server to be protected by ESD 114. In one example, ESD 114 may include an interface through which a system administrator or automated system security controller may define users, create user groups and add users to groups, create command groups and add commands to groups, define data objects, create object groups and add objects to groups. In addition, through the interface, the system administrator or automated system security controller may form rules that specify a user, object, and command groups, with an actions, and then set security policies for applying the rules to determine whether a user communication is authorized.

In one example, if ESD 114 determines that a security policy is violated by a forwarded database request, ESD 114 may respond to agent 112 with a verdict of "DROP DATABASE SESSION". Agent 112 may handle a verdict of "DROP DATABASE SESSION" by interrupting a database session requested by the held request and dropping the request.

In one example, if ESD 114 determines that a security policy is not violated by a request, ESD 114 may respond to agent 112 with a verdict of "RELEASE DATABASE REQUEST". Agent 112 may handle a verdict of "RELEASE DATABASE REQUEST" by releasing the held request to database server 118, and allowing a response to the request by database server 118 to return to database client 110.

In the example in FIG. 1, a DACS implemented within network environment 100 through agent 112 and ESD 114 enforces data access security for database accesses by database clients connecting to database server 118 through an external connection to secured network environment 102 by controlling whether network traffic from external database clients, such as database client 110, is passed through to database server 118. In particular, agent 112, running on the host of database server 118 controls network traffic by intercepting and holding all incoming communications. ESD 114 determines whether or not a security policy is violated by each incoming communication. In the example, while ESD 114 may be aware of a security policy for database client 110, in the DACS illustrated in network environment 100, once ESD 114 allows sensitive data to return from database server 118 to database client 110, none of agent 112, ESD 114, or database server 118 is aware of the security level of database client applications running on database client 110 or of how the sensitive data may be accessed by unauthorized users, such as operating system (OS) users, from database client 110. Database client applications on database client host 106, such as database client 110 and other processes on database client host 106, may not be sufficiently secure. A database user logged into database client 110, who is authorized to access sensitive data from database server 118, may implicitly or explicitly delegate sensitive data to unauthorized users of database client host 106 who are not authorized to access the sensitive data from database server 118. For example, while ESD 114 may detect that a user logged into database client 110 is an authorized database user, and allow the user's communication requests to pass through to database server 118 and to receive sensitive data from database server 118, the user may select a functionality of the database client application, such as OS client application functionality, that may store the sensitive data in a manner that would allow other, unauthorized users to access the sensitive data from the stored location.

Figure 2:
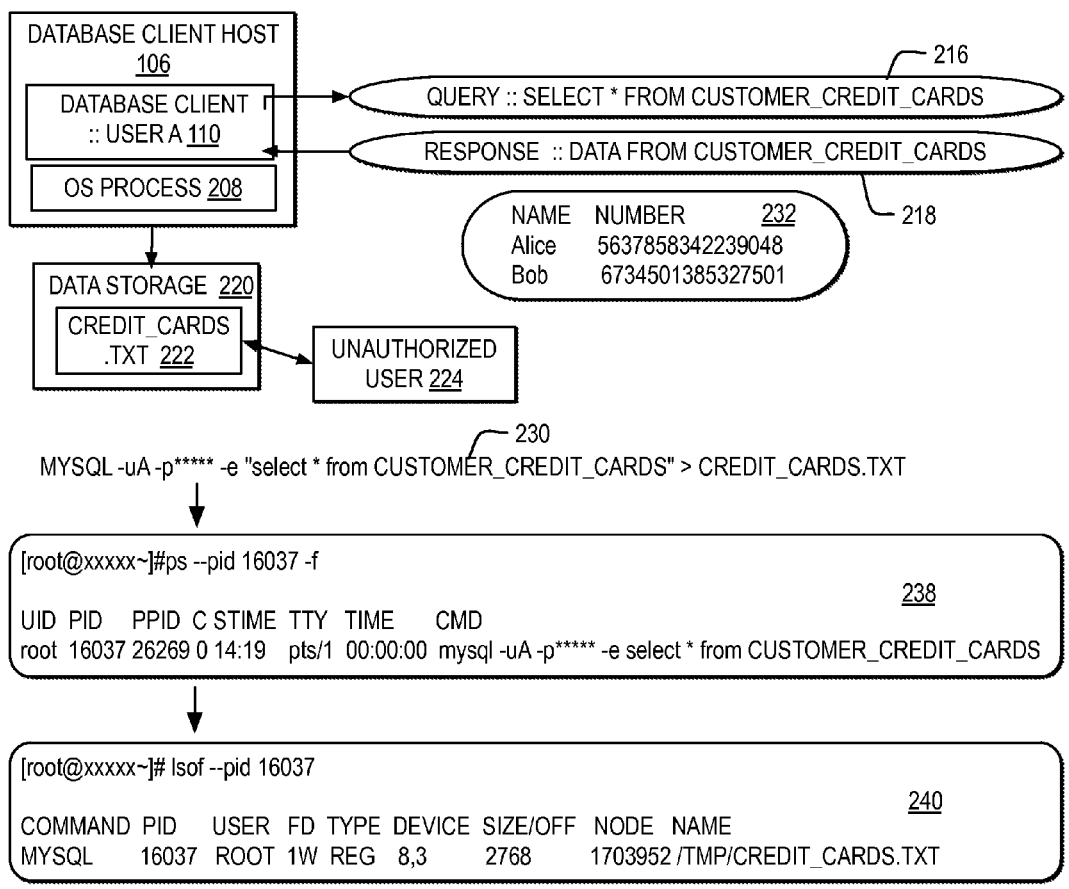
FIG. 2 is an illustrative example of a database client application, of an external database client logged into by a user authorized to access sensitive data from a database server secured by a DACS, performing operations on the sensitive data that allows other, unauthorized users access to the sensitive data.

FIG. 2 illustrates one example of an illustrative example of a database client application, of an external database client logged into by a user authorized to access sensitive data from a database server secured by a DACS, performing operations on the sensitive data that allows other, unauthorized users access to the sensitive data.

In one example, database client 110, logged into by "user A", is hosted by a database client host 106. Database client host 106 may include one or more applications and OS layers. In one example, "user A" is an authorized database user of database server 118.

In one example, "user A" may issue a command 230 for a database session, illustrated as "mysql -uA p***** -e "select * from CUSTOMER_CREDIT_CARDS">CREDIT_CARDS.TXT", on database client host 106. In one example, the mysql portion of command 230 triggers database client 110 to send a query 216 of "select * from CUSTOMER_CREDIT_CARDS" to database server 118. In one example, agent 112 may intercept query 216, directed to database server 118, hold query 216, and forward a packet to ESD 114 requesting a verdict for query 216. In the example, ESD 114 may determine that that the database security policies are validated for "user A", an authorized user, and for the data object requested and may return a verdict of "RELEASE DATABASE REQUEST". In response to receiving the verdict of "RELEASE DATABASE REQUEST", agent 112 may send query 216 to database server 118. Database server 118 may respond to query 216 with a response 218, including sensitive data accessed from CUSTOMER_CREDIT_CARDS in database server 118. In one example, sensitive data 232 returned in response 218 includes two entries, each including a "NAME" and a "NUMBER" of "Alice 5637858342239048" and "Bob 6734501385327501". In the example, sensitive data 232 may represent names and credit card numbers of individuals that need to be secured for access to authorized users only and where access to the sensitive data by unauthorized users may compromise accounts held by the named individuals. In one example, while command 230 is illustrated as an SQL command for an SQL database, in additional or alternate examples, command 230 may implement other types of commands for other types of databases.

In the example, while "user A" is authorized by ESD 114 to receive sensitive data 232, at an external device, command 230 issued on database client host 106, illustrated at reference numeral 230, creates an OS process 208 that directs the sensitive data to be saved to memory in an output file. In one example, OS process 208 may save the output file to memory in a location that is accessible by unauthorized users, other than "user A", who ESD 114 would not have allowed external access to the sensitive data from database server 118. For example, command 230 instructs that the database response to "select * from CUSTOMER_CREDIT_CARDS" should be saved to a file "CREDIT_CARDS.TXT". In one example, OS process 208 performs the portion of command 230 that requires saving the sensitive data in response 218 to a file "CREDIT_CARDS.TXT, where OS process 208 stores a file "CREDIT_CARDS.TXT" 222 in data storage 220. In one example, data storage 220 may represent one or more levels in a hierarchy of memory accessible to database client 110 include, but not limited to, one or more levels of cache accessible to database client host 106, a shared storage device accessible via a network, and a distributed file system accessible to database client host 106. In the example, once sensitive data 232 is stored in a file "CREDIT_CARDS.TXT" 222 in data storage 220, an unauthorized user 224 with access to data storage 220 may access file "CREDIT_CARDS.TXT" 222 from data storage 220 and perform an unauthorized access to the sensitive data in CREDIT_CARDS.TXT. In another example, additional or alternate unauthorized users, with access to data storage 220, may access file "CREDIT_CARDS.TXT" 222 from data storage 220. In one example, unauthorized user 224 may represent an OS user, not authorized "user A", on database client host 106 or an OS user on another system with access to data storage 220.

In one example, in particular, as illustrated at reference numeral 238, OS process 208, created by command 230 has a process identifier (PID) of "16037", and includes a process statement of "[[root@xxxxx~]#ps --pid 16037 -f" and an output file, illustrated at reference numeral 240, of "[root@xxxxx~]# lsof -p 16037.

In the example, for a DACS to provide additional security to restrict processes and output files on database client 106 that would allow unauthorized user 224 to access sensitive data, the DACS may require an additional agent on database client host 106 that is aware of decisions by ESD 114 and may control client process operations and data files, at the OS level, related to sensitive data accessed from database server 118 under the protection of agent 112 and ESD 114.

Figure 3:
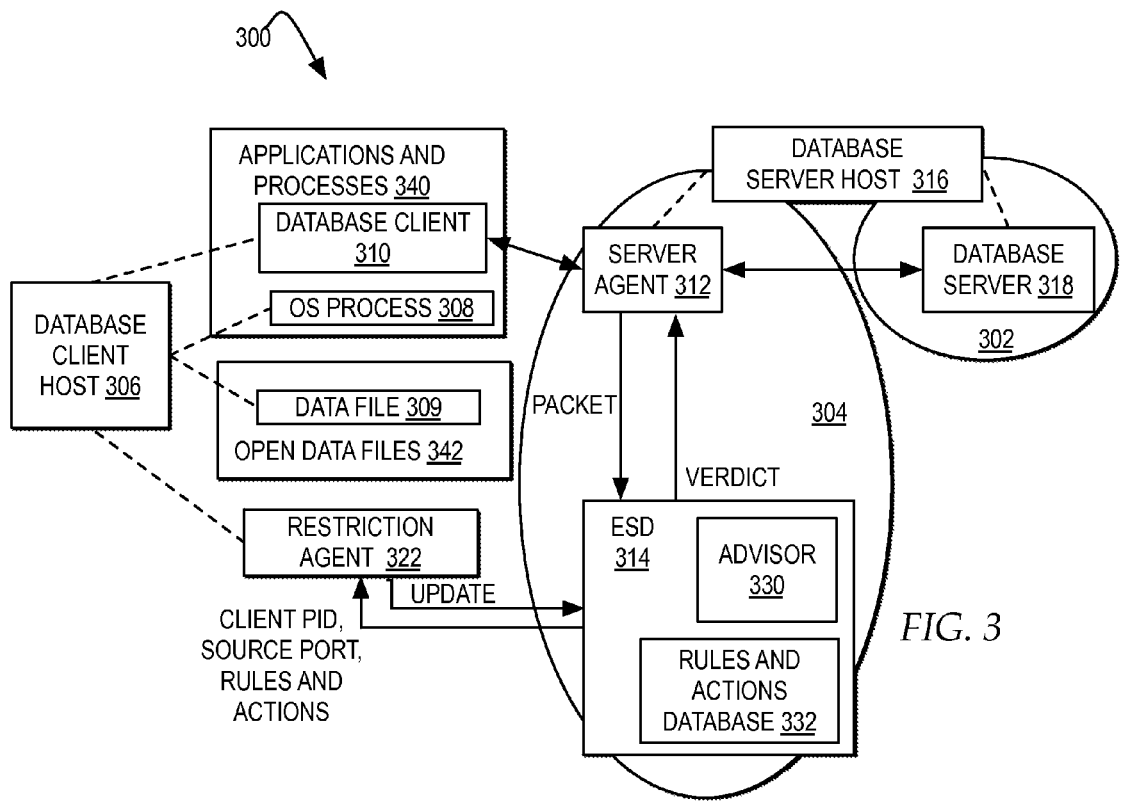
FIG. 3 is a block diagram illustrating one example of a network environment that implements a DACS that secures data accessed by an external database client by detecting and protecting client process operations and data files related to sensitive data accessed through DACS from a database server by an authorized user.

FIG. 3 illustrates a block diagram of one example of a network environment that implements a DACS that secures data accessed by an external database client by detecting and protecting client process operations and data files related to sensitive data accessed through DACS from a database server by an authorized user.

In one example, a network environment 300 includes one or more components of a DACS, for protecting sensitive data in database server 318, at a client level and a server level, including, but not limited to a server agent 312, a restriction agent 322, and an ESD 314. For example, network environment 300 may include a server agent 312, enabled to perform one or more of the functions described with reference to agent 112, a database server 318, enabled to perform one or more of the functions described with reference to database server 118, a database server host 316, enabled to perform one or more of the functions described with reference to database server host 116, a database client 310, enabled to perform one or more of the functions described with reference to database client 110, a database client host 306, enabled to perform one or more of the functions described with reference to database client host 106, and an ESD 314, enabled to perform one or more of the functions described with reference to ESD 114. Database client 310 may include one or more functional layers, including, but not limited to, application layers and OS client application functionality, Database server 318 may be communicatively connected within a secured network environment 302, such as an instance of secured network environment 102. Server agent 312 and ESD 314 may be communicatively connected within a secured network layer 304, such as an instance of secured network layer 304.

In one example, DACS 300 may implement a restriction agent 322, on database client host 306. Restriction agent 322 is enabled to communicate with ESD 314. In one example, restriction agent 322 may represent a lightweight agent resident, installed, and executing on database client host 306 that is aware of decisions by ESD 314 and that may monitor only those client operation processes and data files on database client host 306 that are related to decisions by ESD 314 of DACS 300, according to instructions from ESD 314. In one example, restriction agent 322 will verify and control client operation processes and data files on database client host 306 based on related decisions by ESD 314. Restriction agent 322 may act to protect secured data at an OS level from unauthorized users. In one example, if restriction agent 322 determines there are client operation processes, such as a OS process 308 from among applications and processes 340, or data files, such as data file 309 from among open data files 342, that need to be secured on database client host 306, restriction agent 322 may prevent operation execution of OS process 308 or adjust data file 309 to protect sensitive data. In one example, operations that may be not allowed on sensitive data may include, but are not limited to, a log into a file operation and a copy or paste operation. In one example, the types of sensitive data that may not be allowed in output files may include categories or types of data including, but not limited to, financial account numbers, user identification numbers, user histories, and user preferences. In one example, preventing operation execution may include, but is not limited to, preventing operation execution on invocation or another level. In one example, adjusting sensitive data in output files may include, but is not limited to, data reduction, data masking, file removal, or file monitoring.

In particular, database client host 306 may include many working applications and operations, illustrated by applications and processes 340, and opened data files, illustrated by open data files 342, at run time, however, not all working applications and processes 340 or open data files 342 on database client host 306 are related to data access requests by authorized users to sensitive data on database server 118, as secured by DACS. By restriction agent 322 running as a lightweight agent that receives verdict information from ESD 314, restriction agent 322 may focus on monitoring only a selection of client applications and processes 340, illustrated by OS process 308, and only a selection of open data files, illustrated by data file 309, on database client host 306 that are related to the decision by ESD 314, such that restriction agent 322 is not required to request or scan all working applications and processes and their opened output data files on database client host 306 during run time. For example, command 230 in FIG. 2 of "MYSQL -uA -p***** -e "select * from CUSTOMER_CREDIT_CARDS">CREDIT_CARDS.TXT", may represent a database access request and save to log file command that if handled by database client host 306, may be related to a data access request by an authorized "user A" to data secured by ESD 314, wherein ESD 314 may provide restriction agent 322 a PID for a database session request for query 216, such that restriction agent 322 may monitor only a selection from among other applications and processes 340, such as OS process 308, and only a selection from among open data files 342, such as data file 309, with the same PID, to verify and control the operations and data files. In contrast, not all database access request and save to log file commands at database client host 306 are related to a data access request to sensitive data. For example, a command of "MYSQL -uA -p***** -e "select * from NOT_PROTECTED">NOT_PROTECTED.TXT", represents a data access request and save to log file command that if handled by database client host 306 does not require a data access to sensitive data secured by ESD 314, therefore ESD 314 does not send any instructions to restriction agent 322, and restriction agent 322 does not need to find the command or verify and control the command. By limiting the client operation processes from among other applications and processes 340 that are monitored by restriction agent 322, restriction agent 322 restricts access to sensitive data using minimal resources of database client host 306, such that security is enforced for sensitive data on database client host 306 without degrading the performance of database client host 306 to perform the security enforcement. In contrast, if restriction agent 322 monitored all of applications and processes 340 of database client host 306 to enforce security for sensitive data on database client host 306, restriction agent 322 would require significant amounts of resources, as a heavier process, and may degrade performance.

In addition, by network environment 300 implementing a DACS that includes restriction agent 322 on database client host 306 and providing restriction agent 322 with instructions from ESD 314, restriction agent 322 receives rules and actions from ESD 314 to enforce on database client host 306 to protect sensitive data being accessed by database client host 306. In one example, restriction agent 322 may apply the rules and actions to data file 309, including verifying and controlling all data that includes a credit card number, such as the data in "CREDIT_CARDS.TXT", without needing to request access to all open files from among open data files 342. In one example, restriction agent 322 may monitor the open data file "CREDIT_CARDS.TXT" based on the PID assigned to the command that saves data to the file and apply a rule specified by ESD 314 to the data in "CREDIT_CARDS.TXT". In one example, the rule may include a regular expression that identifies credit card numbers in the file "CREDIT_CARDS.TXT". In one example, if restriction agent 322 identifies a pattern, based on the regular expression, the rule may include an associated action for restriction agent 322 to apply to the file if there is a match for the rule. Actions applied by restriction agent 322 to sensitive data saved to files may include, but are not limited to, data masking, data redaction, file removal, or file masking Actions applied by restriction agent 322 to sensitive data enforce security policies for the sensitive data at the client level.

In one example, database client 310, as an external client, sends a request intended for database server 318, on a non-secured or secured level. In one example, database client 310 may include one or more identifiers of a database client session including, but not limited to, a source and destination IP address, one or more ports, and a PID. In particular, when database client host 306 handles a command, such as command 230 illustrated in FIG. 2, a process identifier (PID) is assigned for identifying the processes and data associated with the command, where the PID may also be included in the database protocol packets sent for a query by database client 310. Server agent 312 on database server host 316 intercepts the request, whether on the non-secured or secured level, holds the request for analysis, and forwards the request within secured network layer 304 to ESD 314. In one example, ESD 314 may identify, from the request, the database client session, according to the source and destination IP addresses, ports, and client PID specified in the request. In one example, ESD 314 may extract information about the data object requested to be accessed and validate the database session security policies against the database object and database client session information. If ESD 314 determines the request validates against the database session security policies, for a user authorized to access sensitive data, ESD 314 may return a verdict that allows server agent 312 to pass the request through to database server 318, such as a verdict of "RELEASE DATABASE REQUEST". If ESD 314 determines the request violates the database session security policies, ESD 314 may return a verdict that allows server agent 312 to drop the request, such as a verdict of "DROP DATABASE SESSION".

In one example, restriction agent 322 receives instructions from ESD 314, including a client PID, rules for detecting any processes or data in open data files that are not permitted, and any actions to apply to the processes or data files to enforce security polices for the sensitive data. In one example, in response to restriction agent 322 receiving the client PID from ESD 314, restriction agent 322 attaches itself to the processes and data files identified by the client PID. Restriction agent 322 may analyze the information received from ESD 314, find only a selection of client processes, such as OS process 308, and data files, such as data file 309, related to the decision on database client host 306 that are identified by the client PID, and verify and control whether access to OS process 308 and data within data file 309 are allowed, based on any rules provided by ESD 314. Restriction agent 322 may take actions to restrict processes or open data files based on the actions specified by ESD 314 to enforce security policies for the sensitive data at the client level. In addition, restriction agent 322 may report to EDS 314 any process or data file restricted.

In one example, database client host 306 and database server host 316 may represent a same host, where database client 310 and database server 318 reside on a same host, but database client 310 accesses database server 318 through a network connection external to secured network environment 302 or where security for the access on the same host is enforced by the DACS. For example, a database administrator may use local connections on a single host to operate database client 310 as an external client to database server 318, on the same host. In one example, even though database client 310 and database server 318 reside on a same host, data accessed by database client 310 as an external client and kept locally on the host, but outside of database server 318 still needs to be protected by agent 322.

In one example, ESD 314 may include one or more additional components, such as an advisor 330, for analyzing database protocol packets received from agent 312, extracting a client PID, source port and other information, determining rules and actions to apply to the data associated with the client PID, from among a rules and actions database 332, and sending information to restriction agent 322 with the client PID and the selected rules and actions. In one example, advisor 330 may manage a directory of restriction agents, such as restriction agent 322, and periodically monitor a status of restriction agent 322.

In one example, ESD 314 may provide an interface through which a system administrator or automated system security controller may set rules and actions in rules and actions database 332. In one example, rules and actions specified in rules and actions database 332 may be specified in association with the security policies specified for determining whether to allow a communication to pass through to database server 318, which include defining users, creating user groups and adding users to groups, creating command groups and adding commands to groups, defining data objects, creating object groups and adding objects to groups, forming rules that specify user, object, and command groups and an action, and forming security policies that specify one or more rules. In another example, rules and actions specified in rules and actions database 332 may be specified according to additional or alternate characteristics.

Figure 4:
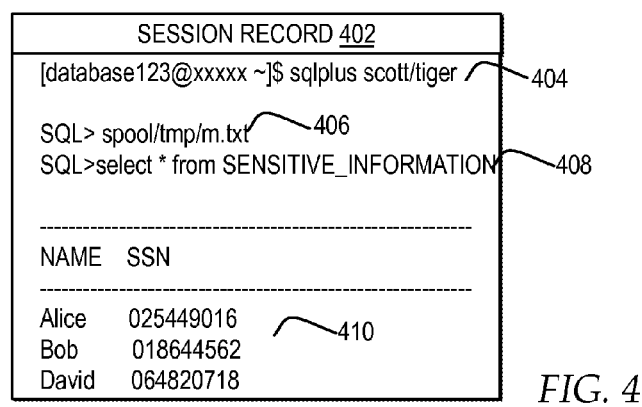
FIG. 4 is an illustrative example of a database session report for an authorized user.

FIG. 4 illustrates an illustrative example of a database session report for an authorized user.

In one example, database server 318 may represent one or more types of databases, including, but not limited to, an ORACLE database, a MICROSOFT (MS) SQL database, and an IBM DB2 database. In one example, database client 310 may represent one or more types of database client applications. For example, where database server 318 is an ORACLE database, database client 310 may represent a database client application of an ORACLE utility SQLPLUS, which does not secure data accessed from database server 318. In additional or alternate examples, database client 310 may represent a database client application specified for other types of databases.

In one example a session record 402 illustrates results of an interaction of a user "SCOTT", who is an authorized user of database server 318, interacting with database server "database123", operated by database server 318, through database client 310, which is external to database server 318. In the example illustrated in FIG. 4, it is assumed that security policies of ESD 314 are not violated by a request from the user "SCOTT".

In one example, session record 402 includes a session command "[database123@xxxxx~]$ sqlplus scott/tiger", illustrated at reference numeral 404, along with a command "SQL>spool/tmp/m.txt", illustrated at reference numeral 406, and "SQL>select * from SENSITIVE_INFORMATION", illustrated at reference numeral 408. The data returned by database server 318 to database client 310, illustrated at reference numeral 410, includes multiple records, each with a name and social security number (SSN), illustrated by "Alice 025449016", "Bob 018644562", and "David 064820718". In one example, one or more portions of the data illustrated at reference numeral 410 may be sensitive data.

FIGS. 5A-5B illustrate one example of multiple steps of a database session illustrated in FIG. 4 for a restriction agent residing on a database client host to protect sensitive data accessed by an authorized user from a database server secured by a DACS, at the client level, by restricting client process operations and data files from using the sensitive data.

In one example, a database session 500, based on session record 402, includes a first step illustrated as OS command 510. Session record 402 includes a command illustrated at reference numeral 404 of "[database123@xxxxx~]$ sqlplus scott/tiger". In one example, during the database session triggered by "[database123@xxxxx~]$ sqlplus scott/tiger", as illustrated at reference numeral 512, the command starts an OS process of OS client 308 on database client host 306. In one example, the OS process belongs to an OS user with a user identifier (UID) of "database123" and with a PID of "18968", as illustrated at reference numeral 514. In one example, the OS command of "sqlplus scott/tiger" also starts an authorization connection for database client 310 to database server 318 for authorized database user "SCOTT". During authentication of user "SCOTT", database server 318 receives client OS process PID "18968" within a packet 516, which is part of a database protocol that does not depend on a type of database client 310.

Next, database session 500 includes a second step illustrated at reference numeral 518, which is performed by server agent 312, and is not directly reflected in session record 402. In the example, as illustrated at reference numeral 518, server agent 312 intercepts database protocol packets along with the previous packet illustrated at reference numeral 516 and server agent 312 sends all the packets to EDS 314 for a verdict.

Next, database session 500 includes a third step illustrated at reference numeral 520, which is performed by ESD 314, and is not directly reflected in session record 402. In the example, as illustrated at reference numeral 520, ESD 314 permits the requests for database client 310 to continue to database server 318 by sending a verdict of "RELEASE DATABASE REQUEST" to server agent 312 and ESD 314 retains session information included in all the packets for the requested database session, along with the client PID of "18968".

Next, database session 500 includes a fourth step illustrated at reference numeral 522, in which a first SQLPLUS command "SQL>spool/tmp/m.txt", illustrated at reference numeral 406 in session record 402, is performed. In the example, the command "SQL>spool/tmp/m.txt", locally creates an output file/tmp/m.txt on database client host 306, as illustrated at reference numeral 526. As illustrated at reference numeral 526, the file belongs to user "database123", who is not authenticated or authorized by database server 318. In the example, SQLPLUS does not send the command "spool/tmp/m.txt" to database server 318, therefore ESD 314 is not aware of the file "/tmp/m.txt" and cannot directly control output of sensitive data to this file by controlling network traffic flow through server agent 312.

Next, database session 500 includes a fifth step illustrated at reference numeral 530, in which a second SQLPLUS command "SQL>select * from SENSITIVE_INFORMATION", illustrated at reference numeral 408 in session record 402, is performed. In the example, as illustrated at reference numeral 534, the command "SQL>select * from SENSITIVE_INFORMATION" triggers database client 310 to send a database protocol packet 536, including SQL statement 532, to database server 318. In the example, as illustrated at reference numeral 538, server agent 312 may intercept packet 536 and pass packet 536 to ESD 314. In addition, as illustrated at reference numeral 538, ESD 314 may parse packet 536, including the SQL statement, to the database operation and database object level and verify the parsed operation and object against security policies.

Next, database session 500 includes a sixth step illustrated at reference numeral 540, which is performed by ESD 314, and is not directly reflected in session record 402. In the example, as illustrated at reference numeral 542, ESD 314 determines that database user "SCOTT" is allowed to use the SQL statement in packet 536 to access a database table "SENSITIVE_INFORMATION" of database server 318, but the data accessed from database table "SENSITIVE_INFORMATION" is sensitive information that must be protected from access by users who are not authenticated and authorized by ESD 314. In addition, as illustrated at reference numeral 544, ESD 314 sends instructions to restriction agent 322 for directing restriction agent 322 how to protect sensitive data accessed from database table "SENSITIVE_INFORMATION" from access by unauthorized users. In one example, the instructions for restriction agent 322 include, but are not limited to, a PID "18968" at reference numeral 546 parsed from packet 516, a rule of "regular expression—[0-1]{9}" illustrated at reference numeral 548, and an action of "mask:*" illustrated at reference numeral 550. In one example, advisor 330 may access a database of instructions including rules and actions set based on the security policies for the sensitive data requested.

Next, database session 500 includes a seventh step illustrated at reference numeral 551, which is performed by restriction agent 322 to protect sensitive data from unauthorized user access from database client host 306 and is not directly reflected in session record 402. In the example, as illustrated at reference numeral 551, in response to receiving the instructions illustrated at reference numeral 544, restriction agent 322 starts to monitor any processes on database client host 306 with a PID of "18968". In the example, restriction agent 322 receives instructions from ESD 314 with a PID, a rule to apply, and an action to take. ESD 314 is not aware of the specific processes or files associated with the PID. Restriction agent 322 only needs to monitor a selection of processes and data files associated with the PID from among multiple processes and data files, which minimizes the bandwidth required for restriction agent 322 to monitor processes and data files on database client host 306 and minimizes the security restrictions removed by database client host 306 to allow restriction agent 322 to monitor processes and data files.

Next, database session 500 includes an eighth step, illustrated at reference numeral 552, which is performed by ESD 314 and server agent 312 and is not directly reflected in session record 402. In the example, as illustrated at reference numeral 552, ESD 314 sends a verdict of "RELEASE DATABASE REQUEST" to server agent 312 and server agent 312 releases the query from packet 536 to database server 518.

Next, database session 500 includes a ninth step, illustrated at reference numeral 554, performed by database server 518. In one example, as illustrated at reference numeral 554, database server 518 returns query results in a results packet 556 to database client 310, referred to as SQLPLUS in command 404 of session record 402. In one example, results packet 556 includes the data illustrated at reference numeral 410 of session record 402, which includes sensitive data.

Next, database session 500 includes a tenth step, illustrated at reference numeral 558, of SQLPLUS command 524, as performed by OS client 308, locally saving results packet 556 into file "/tmp/m.txt" in the form illustrated at reference numeral 560, which is also the form illustrated at reference numeral 410 in session record 402. In the example, ESD 314 is not directly aware of OS client 308 saving results packet 556 into file "/tmp/m.txt". In the example, the file "/tmp/m.txt" includes sensitive data.

Next, database session 500 includes an eleventh step, illustrated at reference numeral 562, illustrating the results of restriction agent 322 monitoring the file "/tmp/m.txt" associated with PID "18968" and applying the rule illustrated at reference numeral 548, to determine that the SSN values comply with the regular expression in the rule. In response, restriction agent 322 masks the SSN values in file "/tmp/m.txt". The new content in file "/tmp/m.txt" is illustrated at reference numeral 564, of "Alice ******", "Bob ****", and "David ******". In the example, according to the instructions issued by ESD 314, the rules require enforcement of security policies for the portion of the returned data that includes a SSN value, but not for the portion of the returned data that includes the name value. In additional or alternate examples, ESD 314 may provide instructions with rules for identifying and actions for adjusting name values.

Next, database session 500 includes a twelfth step, illustrated at reference numeral 566, of restriction agent 322 reporting the action taken to ESD 314. In one example, ESD 314 may send instructions to restriction agent 322 that include multiple rules and multiple actions. Restriction agent 322 may report which rules were run and which actions performed to protect the sensitive data.

Figure 6:
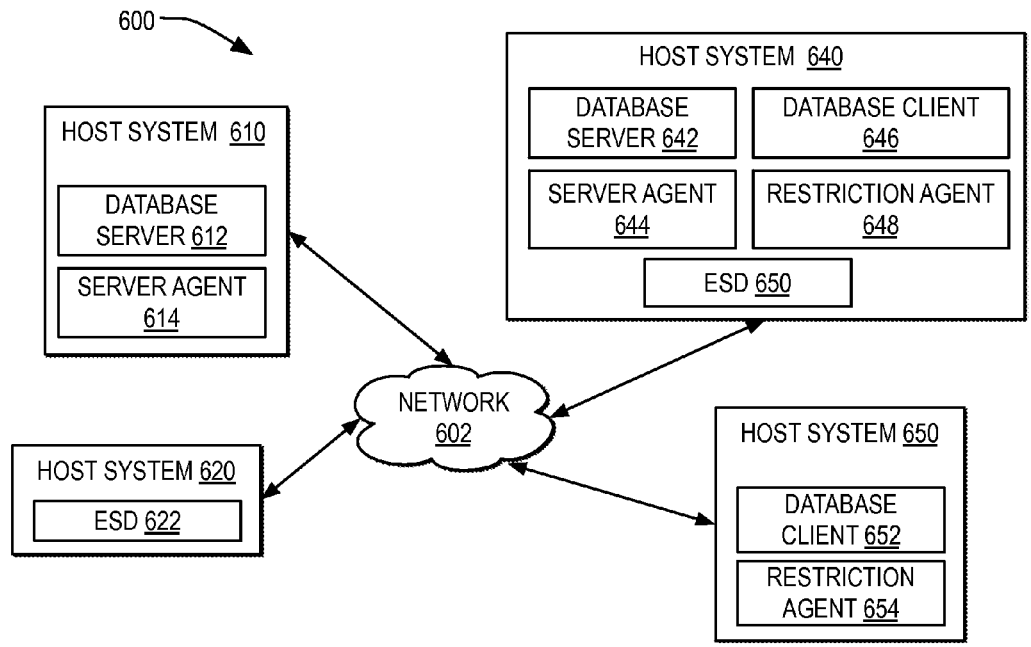
FIG. 6 is one example of a block diagram of a network environment in which one or more database clients, one or more restriction agents, one or more ESD, one or more database servers, and one or more server agents, are implemented.

FIG. 6 illustrates one example of a block diagram of a network environment in which one or more database clients, one or more restriction agents, one or more ESD, one or more database servers, and one or more server agents, are implemented. One of ordinary skill in the art will appreciate that environment 600 is illustrative of one type of network environment that may support clients, servers and other components of a communication system. In addition, one of ordinary skill in the art will appreciate that the distribution of systems within network environment 400 is illustrative of a distribution of systems, however, other distributions of systems within a network environment may be implemented.

As illustrated, multiple systems within network environment 600 may be communicatively connected via network 602, which is the medium used to provide communications links between various devices and computer systems communicatively connected. Network 602 may include permanent connections such as wire or fiber optics cables and temporary connections made through telephone connections and wireless transmission connections, for example, and may include routers, switches, gateways and other hardware to enable a communication channel between the systems connected via network 602. Network 602 may represent one or more of broadcast television networks, including cable, satellite, and internet based television networks across which programs are transmitted, packet-switching based networks, telephony based networks, local area and wire area networks, public networks, and private networks. Network environment 600 may implement multiple types of network architectures.

In one example, as illustrated, a host system 610, a host system 620, a host system 640, and a host system 650 may be communicatively connected via network 602 to one or more other systems. In one example, each of host system 610, host system 620, host system 640, and host system 650 may represent one or more computer systems, such as computer system 700 of FIG. 7, to be described below.

In one example, host system 650, such as an instance of database client host 306, may host a database client 652, such as an instance of database client 310, and a client agent 654, such as an instance of restriction agent 322. In another example, database client host 306 may be distributed across multiple host systems communicatively connected via network 602. In one example, database server host 316 may be distributed across multiple host systems. For example, host system 610, such as an instance of database server host 316, may host a database server 612, such as an instance of database server 318, and a server agent 614, such as an instance of server agent 312. In one example, database client 652 may send a query request to database server 612, which is intercepted by server agent 614, within a DACS. Server agent 614 may forward intercepted database protocol packets to an ESD 622, such as an instance of ESD 314, on host system 620, for ESD 622 to determine whether the database protocol packet meets security policies. If the database protocol packet meets security policies, ESD 622 may send a message to server agent 614 to allow server agent 614 to forward the database protocol packet to database server 612. In addition, if the database protocol packet meets security policies, ESD 622 may send instructions to restriction agent 654 on database client host 650, for instructing restriction agent 654 to whether and how to control processes and data files associated with a PID of the query, to control how database client host 650 handles data returned from database server 612 in response to the database protocol packet.

In one example, host system 640, which hosts an instance of both database client host 306 and database server host 316, may include a database server 642, such as an instance of database server 318, a server agent 644, such as an instance of server agent 312, a database client 646, such as an instance of database client 310, a restriction agent 648, such as an instance of restriction agent 322, and an ESD 650, such as an instance of ESD 314. In one example, while database server 642 and database client 646 may be implemented on a single host system 640, accesses to data on database server 642 still requires a DACS, implemented by ESD 650, server agent 644, and restriction agent 648, to protect accesses from unauthorized users both at the server level and the client level. In one example, database client 652 may also send a database query to database server 642, which is intercepted by server agent 644. In another example, database client 646 may send a database query to database server 612, which is intercepted by server agent 614. In another example, server agent 644 may forward database protocol packets to ESD 622 and server agent 614 may forward database protocol packets to ESD 650. In additional or alternate examples, the components of a DACS may be distributed in additional or alternate systems communicatively connected via network 602.

Figure 7:
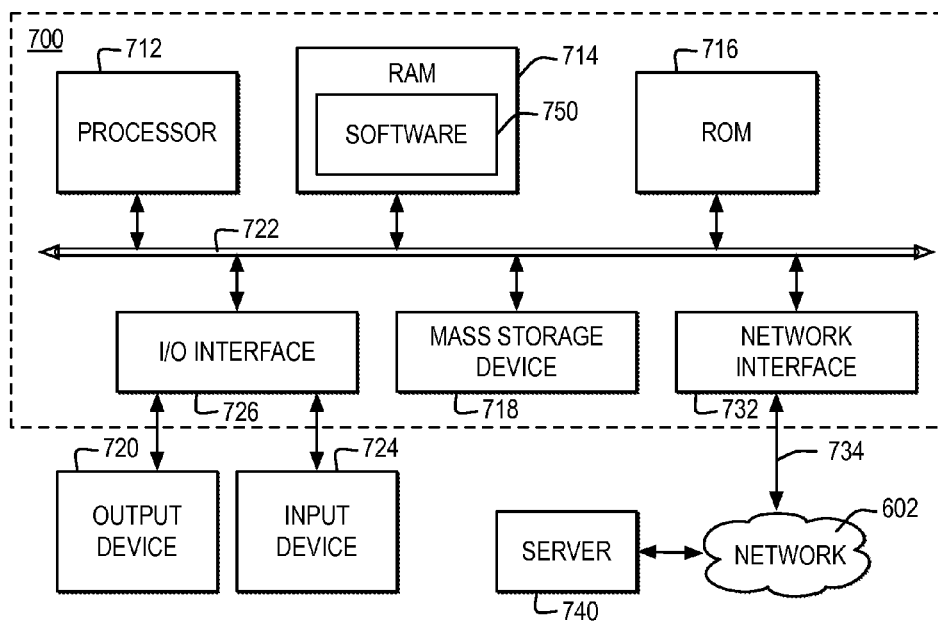
FIG. 7 is a block diagram illustrating one example of a computer system in which one embodiment of the invention may be implemented.

FIG. 7 illustrates a block diagram of one example of a computer system in which one embodiment of the invention may be implemented. The present invention may be performed in a variety of systems and combinations of systems, made up of functional components, such as the functional components described with reference to a computer system 700 and may be communicatively connected to a network, such as network 702.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power.

Processor 712 may be at least one general-purpose processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems within a network including, but not limited to, an adapter, a switch, a server, a cluster system, and a grid environment.

Computer system 700 may communicate with a remote computer, such as server 740, or a remote client. In one example, server 740 may be connected to computer system 700 through any type of network, such as network 602, through a communication interface, such as network interface 732, or over a network link that may be connected, for example, to network 602.

In the example, multiple systems within a network environment may be communicatively connected via network 602, which is the medium used to provide communications links between various devices and computer systems communicatively connected. Network 602 may include permanent connections such as wire or fiber optics cables and temporary connections made through telephone connections and wireless transmission connections, for example, and may include routers, switches, gateways and other hardware to enable a communication channel between the systems connected via network 602. Network 602 may represent one or more of packet-switching based networks, telephony based networks, broadcast television networks, local area and wire area networks, public networks, and restricted networks.

Network 602 and the systems communicatively connected to computer 700 via network 602 may implement one or more layers of one or more types of network protocol stacks which may include one or more of a physical layer, a link layer, a network layer, a transport layer, a presentation layer, and an application layer. For example, network 602 may implement one or more of the Transmission Control Protocol/Internet Protocol (TCP/IP) protocol stack or an Open Systems Interconnection (OSI) protocol stack. In addition, for example, network 602 may represent the worldwide collection of networks and gateways that use the TCP/IP suite of protocols to communicate with one another. Network 602 may implement a secure HTTP protocol layer or other security protocol for securing communications between systems.

In the example, network interface 732 includes an adapter 734 for connecting computer system 700 to network 602 through a link and for communicatively connecting computer system 700 to server 740 or other computing systems via network 602. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

Figure 8:
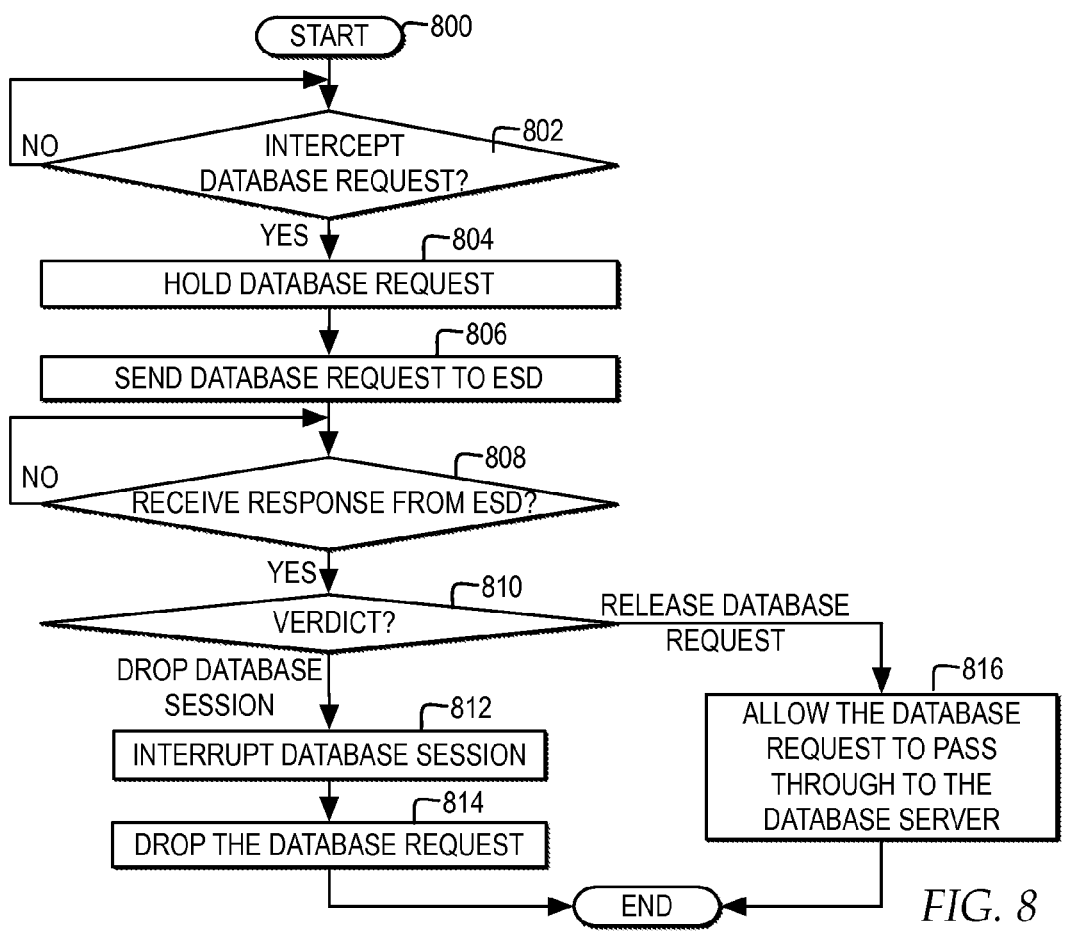
FIG. 8 is a high level logic flowchart of a process and computer program for controlling a server agent executing on a server database host of a database server protected by a DACS.
Figure 9:
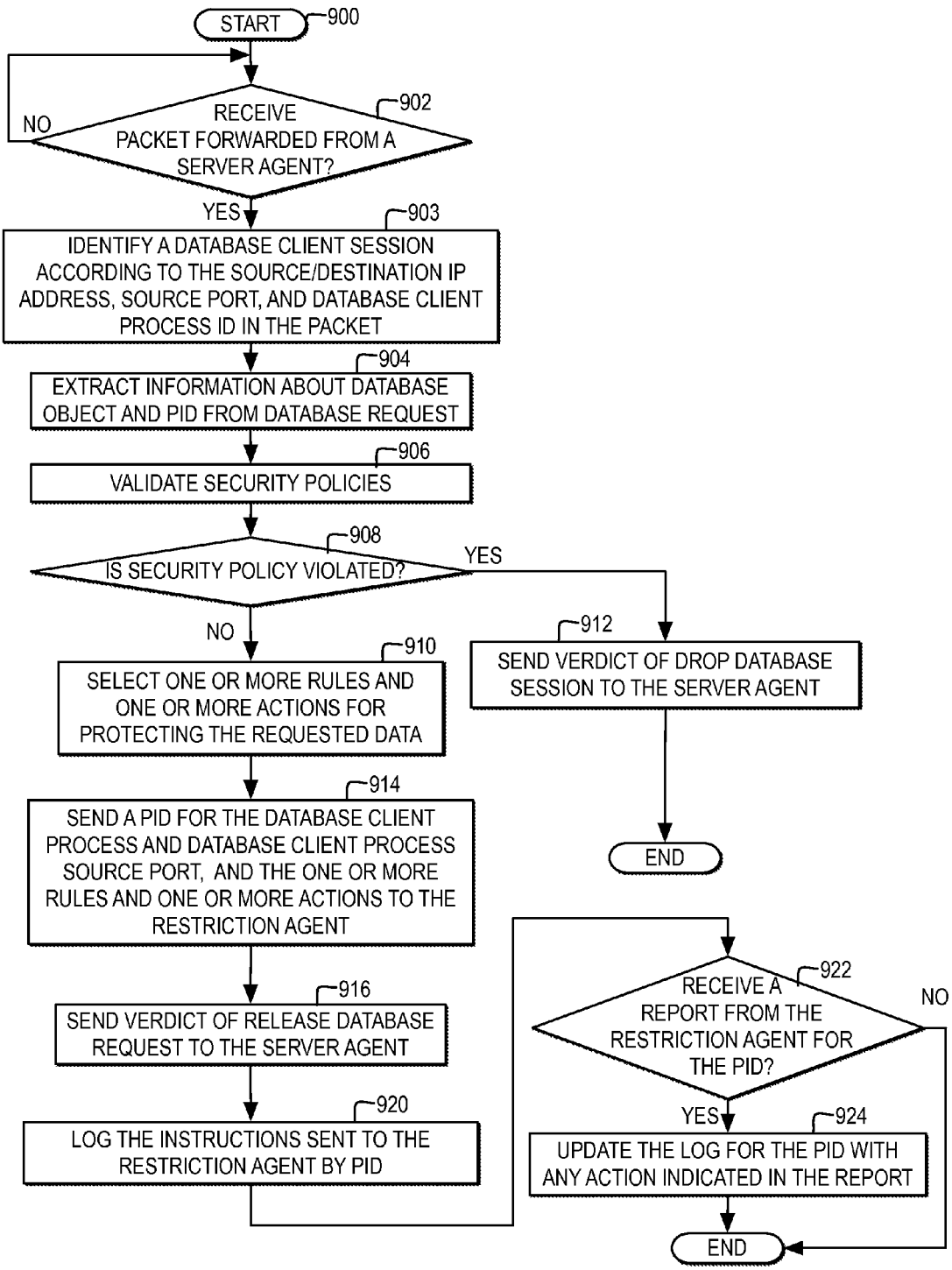
FIG. 9 is a high level logic flowchart of a process and computer program for controlling an ESD for determining whether to control access to data at a server level and at a client level within a DACS.
Figure 10:
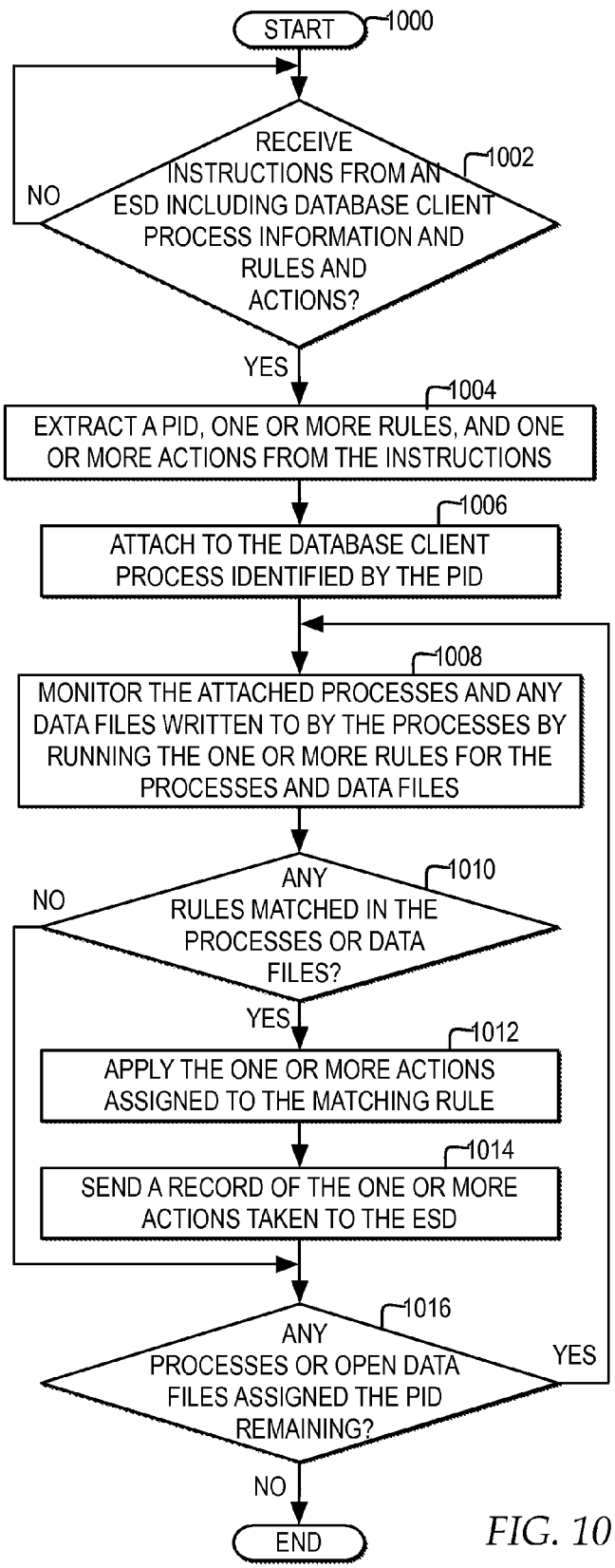
FIG. 10 is a high level logic flowchart of a process and computer program for controlling a restriction agent that interacts with an ESD of a DACS for enforcing security policies for access to sensitive data accessed under the DACS at the client level.

In one embodiment, the operations performed by processor 712 may control the operations of flowchart of FIGS. 8-10 and other operations described herein. Operations performed by processor 712 may be requested by software 750 or other code or the steps of one embodiment of the invention might be performed by specific hardware components that contain hardwired logic for performing the steps, or by any combination of programmed computer components and custom hardware components. In one embodiment, one or more components of computer system 700, or other components, which may be integrated into one or more components of computer system 700, may contain hard-wired logic for performing the operations of flowcharts in FIGS. 8-10.

In addition, computer system 700 may include multiple peripheral components that facilitate input and output. These peripheral components are connected to multiple controllers, adapters, and expansion slots, such as input/output (I/O) interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 7, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

FIG. 8 illustrates a high level logic flowchart of a process and computer program for controlling a server agent executing on a server database host of a database server protected by a DACS.

In one example, a process and computer program starts at block 800 and thereafter proceeds to block 802. Block 802 illustrates a determination whether a database request directed to a database server is intercepted. At block 802, if a database request directed to a database server is intercepted, then the process passes to block 804. Block 804 illustrates holding the database request. Next, block 806 illustrates sending the database request to an ESD. Thereafter, block 808 illustrates a determination whether a response is received from the ESD. At block 808, once a response is received from the ESD, then the process passes to block 810. Block 810 illustrates a determination of what type of verdict is received from the ESD.

At block 810, if the verdict received from the ESD is a "DROP DATABASE SESSION" verdict, then the process passes to block 812. Block 812 illustrates interrupting the database session. Next, block 814 illustrates dropping the database request, and the process ends.

Returning to block 810, if the verdict received from the ESD is "RELEASE DATABASE REQUEST" verdict, then the process passes to block 816. Block 816 illustrates allowing the database request to pass through to the database server, and the process ends.

FIG. 9 illustrates a high level logic flowchart of a process and computer program for controlling an ESD for determining whether to control access to data at a server level and at a client level within a DACS.

In one example, the process and computer program starts at block 900 and thereafter proceeds to block 902. Block 902 illustrates a determination of whether an ESD receives a packet forwarded from a server agent. At block 902, if an ESD receives a packet forwarded from a server agent, then the process passes to block 903. Block 903 illustrates identifying a database client session according to the source/destination IP address, source port, and database client process ID. Next, block 904 illustrates extracting information about one or more database objects and a PID from the database request. Next, block 906 illustrates validating security policies against the extracted information. Thereafter, block 908 illustrates a determination whether a security policy is violated. At block 908, if the security policy is violated, then the process passes to block 912. Block 912 illustrates sending the verdict of "DROP DATABASE SESSION" to the server agent, and the process ends.

Returning to block 908, if the security policy is not violated, then the process passes to block 910. Block 910 illustrates selecting one or more rules and one or more actions for protecting the requested data from among the rules and action database. Next, block 914 illustrates sending a PID for the database client process and database client source port, and one or more rules and one or more actions, to a restriction agent on the database client host that sent the packet. Next, block 916 illustrates sending a verdict of "RELEASE DATABASE REQUEST" to the server agent. Thereafter, block 920 illustrates logging the instructions sent to the restriction agent by the PID. Thereafter, block 922 illustrates a determination whether a report is received from the restriction agent for the PID. At block 922, if no report is received from the restriction agent for the PID after a period of time, then the process ends. At block 922, if the report is received from the restriction agent for the PID, then the process passes to block 924. Block 924 illustrates updating the log for the PID with any action indicated in the report, and the process ends.

FIG. 10 illustrates a high level logic flowchart of a process and computer program for controlling a restriction agent that interacts with an ESD of a DACS for enforcing security policies for access to sensitive data accessed under the DACS at the client level.

In one example, the process and computer program starts at block 1000, and thereafter proceeds to block 1002. Block 1002 illustrates a determination whether a restriction agent receives instructions from an ESD including database client process information and rules and actions. At block 1002, when a restriction agent receives instructions from the ESD, then the process passes to block 1004. Block 1004 illustrates extracting a PID, one or more rules, and one or more actions from the instructions. Next, block 1006 illustrates attaching to the database client OS processes identified by the PID. Thereafter, block 1008 illustrates monitoring the attached processes and any data files written to by the processes by running the one or more rules for the processes and data files, and the process passes to block 1010.

Block 1010 illustrates a determination whether any rules are matched in the processes or data files. At block 1010, if no rules are matched in the processes or data files, then the process passes to block 1016. Returning to block 1010, if any rules are matched in the processes or data files, then the process passes to block 1012. Block 1012 illustrates applying the one or more actions assigned to the matching rule. Next, block 1014 illustrates sending a record of the one or more actions taken to the ESD. Thereafter, block 1016 illustrates a determination whether there are any active processes or open data files assigned the PID that remain. At block 1016, if there are any active processes or open data files assigned the PID that remain, then the process returns to block 1008. At block 1016, if there are not any active processes or open data files assigned the PID that remain, then the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method, comprising:
providing, by a computer, a restriction agent resident on a database client host, the database client host receiving first data from a database secured by a database access control system, the first data comprising sensitive information authorized by the database access control system for access by an authorized user requesting access to the database through a database client resident on the database client host, the database client sending one or more database protocol packets for requesting access to the database, the one or more database protocol packets specifying a particular process identifier for one or more particular processes from among a plurality of processes running on the database client host, wherein the database access control system intercepts the one or more database protocol packets between the database client resident on the database client host and the database and determines whether to allow the one or more database protocol packets that are intercepted to pass through from the database client to the database based on whether the one or more database protocol packets meet a security policy applied by the database access control system to the one or more database protocol packets;
receiving, by the restriction agent, one or more instructions from the database access control system relative to the first data, the one or more instructions created by the database access control system based on analysis of the one or more database protocol packets sent by the database client relative to the first data, the one or more instructions specifying the particular process identifier; and
enforcing, by the restriction agent, the one or more instructions on the database client host to restrict access to the first data to the authorized user only from among a plurality of users of the database client host and to the one or more particular processes only identified in the particular process identifier from among the plurality of processes.

2. The method according to claim 1, wherein enforcing, by the restriction agent, the one or more instructions on the database client host to restrict access to the first data to the authorized user only from among a plurality of users of the database client host, further comprises:
enforcing, by the restriction agent, the one or more instructions on the database client host to restrict one or more client system resources on the client system comprising one or more users of the plurality of users, other than the authorized user, from accessing the first data in an opened data file.

3. The method according to claim 1, wherein enforcing, by the restriction agent, the one or more instructions on the database client host to restrict access to the first data to the authorized user only from among a plurality of users of the database client host, further comprises:
enforcing, by the restriction agent, the one or more instructions on the database client host to restrict access to the first data to the authorized user only from among the plurality of users, the plurality of users comprising a plurality of operating system users.

4. The method according to claim 1, wherein receiving, by the restriction agent, one or more instructions from a database access control system relative to the first data further comprises:
receiving, by the restriction agent, one or more instructions from a database access control system created by analysis of database protocol packets sent by the database client application to the database server and relative to the first data.

5. The method according to claim 1, further comprising:
receiving, by the restriction agent, the one or more instructions specifying the particular process identifier of the one or more particular processes from among a plurality of processes running on the database client host, one or more rules, and one or more actions associated with the one or more rules; and
attaching, by the restriction agent, to only the one or more particular processes on the database client host that are each assigned a process identifier matching the particular process identifier from among the plurality of processes running on the database client host;
monitoring, by the restriction agent, only the one or more particular processes from among the plurality of processes for one or more types of operations matching the one or more rules; and
responsive to detecting the one or more types of operations matching the one or more rules, performing, by the restriction agent, the one or more actions associated with the one or more types of rules to prevent execution of the one or more operations to restrict access to the first data to the authorized user only.

6. The method according to claim 1, further comprising:
receiving, by the restriction agent, the one or more instructions specifying a particular process identifier, one or more rules, and one or more actions associated with the one or more rules; and
attaching, by the restriction agent, to one or more processes on the database client host that are each assigned a process identifier matching the particular process identifier;
monitoring, by the restriction agent, one or more open data files written to by the one or more processes for one or more types of data matching the one or more rules; and
responsive to detecting the one or more types of data matching the one or more rules, performing, by the restriction agent, the one or more actions associated with the one or more types of rules to adjust the data in the one or more open data files to restrict access to the first data to the authorized user only.

7. The method according to claim 6, wherein responsive to detecting the one or more types of data matching the one or more rules, performing, by the restriction agent, the one or more actions associated with the one or more types of rules to adjust the data in the one or more open data files to restrict access to the first data to the authorized user only, further comprises:
performing, by the restriction agent, the one or more actions to adjust the data in the one or more open data files by one or more of data masking, data redaction, file removal, and file masking.

8. The method according to claim 1, further comprising:
responsive to the restriction agent enforcing the one or more instructions on the restriction agent host, sending, by the restriction agent, a record of one or more actions taken by the restriction agent to enforce the one or more instructions to the database access control system.

9. The method according to claim 1, wherein providing, by a computer, a restriction agent resident on a database client host that receives first data from a database secured by a database access control system, the first data comprising sensitive information authorized by the database access control system for access by an authorized user requesting access to the database through a database client resident on the database client host, further comprises:
providing the database client host that receives first data from the database secured by a database access control system, the database access control system intercepting communications between the database client resident on the database client host and the database, the database access control system determining whether to allow intercepted communications to pass through from the database client to the database based on whether the communications meet a security policy applied by the database access control system to the communications.

10. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
program instructions to provide a restriction agent resident on a database client host, the database client host receiving first data from a database secured by a database access control system, the first data comprising sensitive information authorized by the database access control system for access by an authorized user requesting access to the database through a database client resident on the database client host, the database client sending one or more database protocol packets for requesting access to the database, the one or more database protocol packets specifying a particular process identifier for one or more particular processes from among a plurality of processes running on the database client host, wherein the database access control system intercepts the one or more database protocol packets between the database client resident on the database client host and the database and determines whether to allow the one or more database protocol packets that are intercepted to pass through from the database client to the database based on whether the one or more database protocol packets meet a security policy applied by the database access control system to the one or more database protocol packets;
program instructions to receive, by the restriction agent, one or more instructions from the database access control system relative to the first data, the one or more instructions created by the database access control system based on analysis of the one or more database protocol packets sent by the database client relative to the first data, the one or more instructions specifying the particular process identifier; and
program instructions to enforce, by the restriction agent, the one or more instructions on the database client host to restrict access to the first data to the authorized user only from among a plurality of users of the database client host and to the one or more particular processes only identified in the particular process identifier from among the plurality of processes.

11. The computer system according to claim 10, wherein the program instructions to enforce, by the restriction agent, the one or more instructions on the database client host to restrict access to the first data to the authorized user only from among a plurality of users of the database client host, further comprise:
program instructions to enforce, by the restriction agent, the one or more instructions on the database client host to restrict one or more client system resources on the client system comprising one or more users of the plurality of users, other than the authorized user, from accessing the first data in an opened data file.

12. The computer system according to claim 10, wherein the program instructions to enforce, by the restriction agent, the one or more instructions on the database client host to restrict access to the first data to the authorized user only from among a plurality of users of the database client host, further comprise:
    program instructions to enforce, by the restriction agent, the one or more instructions on the database client host to restrict access to the first data to the authorized user only from among the plurality of users, the plurality of users comprising a plurality of operating system users.

13. The computer system according to claim 10, wherein the program instructions to receive, by the restriction agent, one or more instructions from a database access control system relative to the first data further comprise:
    program instructions to receive, by the restriction agent, one or more instructions from a database access control system created by analysis of database protocol packets sent by the database client application to the database server and relative to the first data.

14. The computer system according to claim 10, the stored program instructions further comprising:
    program instructions to receive, by the restriction agent, the one or more instructions specifying a particular process identifier, one or more rules, and one or more actions associated with the one or more rules; and
    program instructions to attach, by the restriction agent, to one or more processes on the database client host that are each assigned a process identifier matching the particular process identifier;
    program instructions to monitor, by the restriction agent, the one or more processes for one or more types of operations matching the one or more rules; and
    program instructions to, responsive to detecting the one or more types of operations matching the one or more rules, perform, by the restriction agent, the one or more actions associated with the one or more types of rules to prevent execution of the one or more operations to restrict access to the first data to the authorized user only.

15. The computer system according to claim 10, further comprising:
    program instructions to receive, by the restriction agent, the one or more instructions specifying the particular process identifier of the one or more particular processes from among a plurality of processes running on the database client host, one or more rules, and one or more actions associated with the one or more rules; and
    program instructions to attach, by the restriction agent, to only the one or more particular processes on the database client host that are each assigned a process identifier matching the particular process identifier from among the plurality of processes running on the database client host;
    program instructions to monitor, by the restriction agent, only the one or more particular processes from among the plurality of processes for one or more types of operations matching the one or more rules; and
    program instructions to, responsive to detecting the one or more types of data matching the one or more rules, perform, by the restriction agent, the one or more actions associated with the one or more types of rules to adjust the data in the one or more open data files to restrict access to the first data to the authorized user only.

16. The computer system according to claim 15, wherein the program instructions to, responsive to detecting the one or more types of data matching the one or more rules, perform, by the restriction agent, the one or more actions associated with the one or more types of rules to adjust the data in the one or more open data files to restrict access to the first data to the authorized user only, further comprise:
    program instructions to perform, by the restriction agent, the one or more actions to adjust the data in the one or more open data files by one or more of data masking, data redaction, file removal, and file masking.

17. The computer system according to claim 10, the stored program instructions further comprising:
    program instructions to, responsive to the restriction agent enforcing the one or more instructions on the restriction agent host, send, by the restriction agent, a record of one or more actions taken by the restriction agent to enforce the one or more instructions to the database access control system.

18. The computer system according to claim 10, wherein program instructions to provide, by a computer, a restriction agent resident on a database client host that receives first data from a database secured by a database access control system, the first data comprising sensitive information authorized by the database access control system for access by an authorized user requesting access to the database through a database client resident on the database client host, further comprise:
    program instructions to provide the database client host that receives first data from the database secured by a database access control system, the database access control system intercepting communications between the database client resident on the database client host and the database, the database access control system determining whether to allow intercepted communications to pass through from the database client to the database based on whether the communications meet a security policy applied by the database access control system to the communications.

19. A computer program product comprising one or more computer-readable storage devices and program instructions, stored on at least one of the one or more storage devices, the stored program instructions comprising:
    program instructions to provide a restriction agent resident on a database client host, the database client host receiving first data from a database secured by a database access control system, the first data comprising sensitive information authorized by the database access control system for access by an authorized user requesting access to the database through a database client resident on the database client host, the database client sending one or more database protocol packets for requesting access to the database, the one or more database protocol packets specifying a particular process identifier for one or more particular processes from among a plurality of processes running on the database client host, wherein the database access control system intercepts the one or more database protocol packets between the database client resident on the database client host and the database and determines whether to allow the one or more database protocol packets that are intercepted to pass through from the database client to the database based on whether the one or more database protocol packets meet a security policy applied by the database access control system to the one or more database protocol packets program instructions to receive, by the restriction agent, one or more instructions from the database access control system relative to the first data, the one or more instructions created by the database access control system based on analysis of the one or more database protocol packets sent by the database client relative to the first data, the one or more instructions specifying the particular process identifier; and program instructions to enforce, by the restriction agent, the one or more instructions on the database client host to restrict access to the first data to the authorized user only from among a plurality of users of the database client host and to the one or more particular processes only identified in the particular process identifier from among the plurality of processes.

20. The computer program product according to claim 19, wherein the program instructions to enforce, by the restriction agent, the one or more instructions on the database client host to restrict access to the first data to the authorized user only from among a plurality of users of the database client host, further comprise:

program instructions to enforce, by the restriction agent, the one or more instructions on the database client host to restrict one or more client system resources on the client system comprising one or more users of the plurality of users, other than the authorized user, from accessing the first data in an opened data file.

* * * * *